US010768486B2

(12) United States Patent
Lee et al.

(10) Patent No.: US 10,768,486 B2
(45) Date of Patent: Sep. 8, 2020

(54) DISPLAY DEVICE

(71) Applicant: Samsung Display Co., Ltd., Yongin-si (KR)

(72) Inventors: Sehyun Lee, Hwaseong-si (KR); Haksun Chang, Yongin-si (KR); Cheol Shin, Hwaseong-si (KR); Seungmin Lee, Seoul (KR); Byoungsun Na, Seoul (KR); Kiwon Park, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 130 days.

(21) Appl. No.: 16/174,726

(22) Filed: Oct. 30, 2018

(65) Prior Publication Data

US 2019/0129255 A1 May 2, 2019

(30) Foreign Application Priority Data

Oct. 30, 2017 (KR) ........................ 10-2017-0142818

(51) Int. Cl.
*G02F 1/1337* (2006.01)
*G02F 1/1343* (2006.01)

(52) U.S. Cl.
CPC .. *G02F 1/133707* (2013.01); *G02F 1/133753* (2013.01); *G02F 1/134309* (2013.01); *G02F 2001/134345* (2013.01)

(58) Field of Classification Search
CPC ......... G02F 1/133707; G02F 1/134309; G02F 1/133753; G02F 2001/134345
See application file for complete search history.

(56) References Cited

U.S. PATENT DOCUMENTS 9,541,804 B2 1/2017 Lee et al.
9,594,279 B2 3/2017 Yoon et al.
9,823,512 B2 11/2017 Chang et al.
9,846,331 B2 12/2017 Lee et al.
9,904,111 B2 2/2018 Lee et al.
(Continued)

FOREIGN PATENT DOCUMENTS

KR 10-2014-0109744 9/2014
KR 10-2016-0027333 3/2016
(Continued)

*Primary Examiner* — Phu Vu

(74) *Attorney, Agent, or Firm* — H.C. Park & Associates, PLC

(57) ABSTRACT

A display device including a first substrate including pixel electrodes arranged in first and second directions, each pixel electrode including a unit pixel electrode, a second substrate including a common electrode on which an opening pattern is formed, and a liquid crystal layer disposed between the first substrate and the second substrate. The unit pixel electrode includes a central electrode portion including diagonal sides, connection sides, a cross slit extending in the first and second directions, and central branch slits extending from the cross slit, and a branch electrode portion including branch electrodes protruding from each of the diagonal sides, in which the connection sides includes first and second connection sides extending in the first and second directions, and the central electrode portion has first outer areas adjacent to the first connection sides and on which first control slits extending in the first direction are respectively formed.

20 Claims, 11 Drawing Sheets

(56) References Cited

U.S. PATENT DOCUMENTS

| | | | | |
|---|---|---|---|---|
| 2014/0253859 | A1 | 9/2014 | Yoon et al. | |
| 2016/0062189 | A1 | 3/2016 | Chang et al. | |
| 2016/0097953 | A1 | 4/2016 | Chang et al. | |
| 2016/0097956 | A1 | 4/2016 | Lee et al. | |
| 2016/0147118 | A1* | 5/2016 | Lee | G02F 1/133345 349/138 |
| 2016/0363823 | A1 | 12/2016 | Lee et al. | |
| 2017/0003549 | A1 | 1/2017 | Lee et al. | |

FOREIGN PATENT DOCUMENTS

| | | |
|---|---|---|
| KR | 10-2016-0041161 | 4/2016 |
| KR | 10-2016-0145912 | 12/2016 |
| KR | 10-2017-0005335 | 1/2017 |

* cited by examiner

DISPLAY DEVICE

CROSS REFERENCE TO RELATED APPLICATION

This application claims priority from and the benefit of Korean Patent Application No. 10-2017-0142818, filed on Oct. 30, 2017, which is hereby incorporated by reference for all purposes as if fully set forth herein.

BACKGROUND

Field

Exemplary embodiments of the invention relate generally to a display device with improved transmittance and side visibility.

Discussion of the Background

A liquid crystal display device may include a liquid crystal display panel, which includes two substrates facing each other, and a liquid crystal layer disposed between the substrates. The liquid crystal display device may form an electric field in the liquid crystal layer by applying a voltage to an electrode for generating the electric field. The electric field may determine an alignment direction of liquid crystal molecules of the liquid crystal layer and control polarization of incident light to display an image.

A vertically aligned mode liquid crystal display device may include liquid crystal molecules having long axes vertically aligned between two substrates when an electric field is not applied. The vertically aligned mode liquid crystal display device may have a large contrast ratio and a wide reference viewing angle.

In the vertically aligned mode liquid crystal display device, a plurality of domains may be formed by fine slits formed in a pixel electrode to secure a wide viewing angle. In addition, an opened pattern may be provided in a common electrode facing the pixel electrode to secure stability of the domains. Liquid crystal molecules not controlled by a fringe field in the domain may not form a predetermined angle with a polarization axis of a polarizing plate, and thus a gray or black point may be viewed to a user. Therefore, a transmittance of a display device may be reduced.

The above information disclosed in this Background section is only for understanding of the background of the inventive concepts, and, therefore, it may contain information that does not constitute prior art.

SUMMARY

Devices constructed according to exemplary embodiments of the invention are capable of improving transmittance and side visibility.

Additional features of the inventive concepts will be set forth in the description which follows, and in part will be apparent from the description, or may be learned by practice of the inventive concepts.

A display device according to an exemplary embodiment includes a first substrate including a plurality of pixel electrodes arranged in a first direction and a second direction intersecting the first direction, each of the pixel electrodes including a unit pixel electrode, a second substrate including a common electrode on which an opening pattern is formed, and a liquid crystal layer disposed between the first substrate and the second substrate. The unit pixel electrode includes a central electrode portion including a plurality of diagonal sides, a plurality of connection sides, a cross slit extending in the first and second directions, and a plurality of central branch slits extending from the cross slit, and a branch electrode portion including a plurality of branch electrodes protruding from each of the diagonal sides, in which the connection sides include first connection sides extending in the first direction and second connection sides extending in the second direction, and the central electrode portion has first outer areas adjacent to the first connection sides and on which first control slits extending in the first direction are respectively formed.

The central electrode portion may further has second outer areas adjacent to the second connection sides and on which second control slits extending in the second direction are respectively formed.

Each of the pixel electrodes may include a first unit pixel electrode, a second unit pixel electrode, and a third unit pixel electrode arranged in the first direction.

In the first unit pixel electrode, the central electrode portion may have second outer areas adjacent to the second connection sides thereof and on which second control slits extending in the second direction are respectively formed, in the second unit pixel electrode, the central electrode portion may have a third outer area adjacent to one of the second connection sides adjacent to the first unit pixel electrode and on which a third control slit extending in the second direction is formed, and in the third unit pixel electrode, the central electrode portion may have a fourth outer area adjacent to one of the second connection sides adjacent to the first unit pixel electrode of a neighboring pixel electrode and on which a fourth control slit extending in the second direction is formed.

Each of the first control slits may include a first partial control slit and a second partial control slit, respectively extending in parallel with the first direction from adjacent diagonal sides.

A length of each of the first and second partial control slits may be less than $\chi\sqrt{2}$, where $\chi$ denotes a minimum distance between the opening pattern and one of the diagonal sides in a plan view.

The opening pattern may not overlap with the cross slit in a plan view.

A distance between the opening pattern and the cross slit may be at least 3 micrometers in a plan view.

The central electrode portion may have an octagonal shape defined by the diagonal sides and the connection sides, and ends of the branch electrodes may be disposed along imaginary extension lines of the connection sides.

A width of each of the first control slits may be equal to a distance between adjacent branch electrodes.

A minimum distance between the first connection sides and the first control slits may be equal to a width of each of the branch electrodes.

The diagonal sides may include first diagonal sides extending in a third direction intersecting the first and second directions, and second diagonal sides extending in a fourth direction intersecting the first to third directions, and at least a portion of the branch electrodes extending from the first diagonal sides may extend in parallel with the fourth direction, and at least a portion of the branch electrodes extending from the second diagonal sides may extend in parallel with the third direction.

The opening pattern may be disposed between the central branch slits and the branch electrodes in a plan view.

A display device according to another exemplary embodiment includes a first substrate including a unit pixel electrode, a second substrate including a common electrode, and a liquid crystal layer disposed between the first substrate and the second substrate, in which the unit pixel electrode includes a cross slit, a plurality of central branch slits, a plurality of outer branch slits, and a first control slit, the cross slit includes slits extending in a first direction and a second direction to intersect each other at a center of the unit pixel electrode; the central branch slits extend from the cross slit in a third direction and a fourth direction intersecting the first and second directions, respectively, the outer branch slits extend from a contour of the unit pixel electrode toward the central branch slits in the third direction and the fourth direction, the first control slit extends in the first direction in a first outer area adjacent to the contour of the unit pixel electrode, and the first control slit does not overlap with the outer branch slits when viewed in the second direction.

The first outer area may be defined between the contour of the unit pixel electrode and an end of the cross slit extending in the second direction.

The unit pixel electrode may further include a second control slit extending in the second direction in a second outer area adjacent to the contour of the unit pixel electrode, and the second control slit may not overlap with the outer branch slits when viewed in the first direction.

The second outer area may be defined between the contour of the unit pixel electrode and an end of the cross slit extending in the first direction.

The common electrode may have an opening pattern, and the opening pattern may overlap with an area between the central branch slits and the outer branch slits in a plan view.

The opening pattern may not overlap with the cross slit in a plan view, and a distance between the opening pattern and the cross slit may be at least 3 micrometers in a plan view.

A width of the first control slit may be equal to a width of each of the outer branch slits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1A:
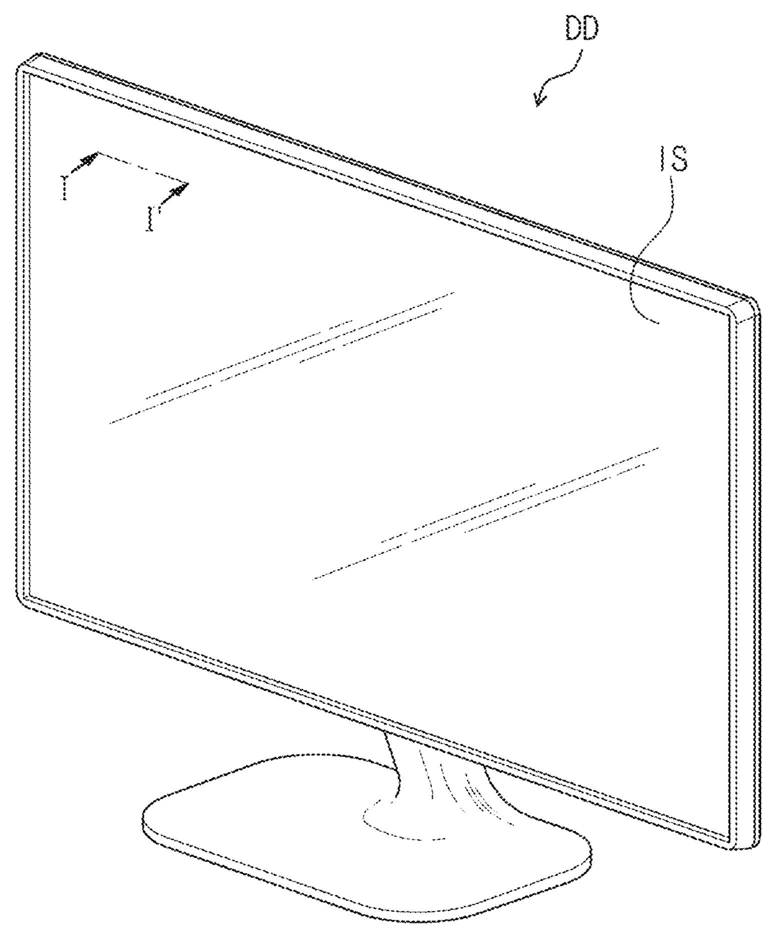
FIG. 1A is a perspective view illustrating a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a perspective view illustrating a display device DD according to an exemplary embodiment of the invention.

Referring to FIG. 1A, a display device DD may display an image through a display surface IS. In FIG. 1A, the display surface IS is parallel to a plane defined by a first direction DR1 and a second direction DR2 intersecting the first direction DR1. However, the inventive concepts are not limited thereto, and a display surface of a display device may have a bent or curved shape, for example.

A thickness direction of the display device DD is indicated by a third direction DR3. However, directions indicated by the first to third directions DR1, DR2 and DR3 may be relative concepts and may be changed into other directions.

The display device DD may be used in large-sized electronic devices (e.g., televisions, monitors, and external billboards) and small and middle-sized electronic devices (e.g., personal computers, notebook computers, personal digital assistants (PDAs), car navigation units, game consoles, portable electronic devices, and cameras). However, the inventive concepts are not limited thereto, and the display device DD may be applied to other various electronic devices.

Figure 1B:
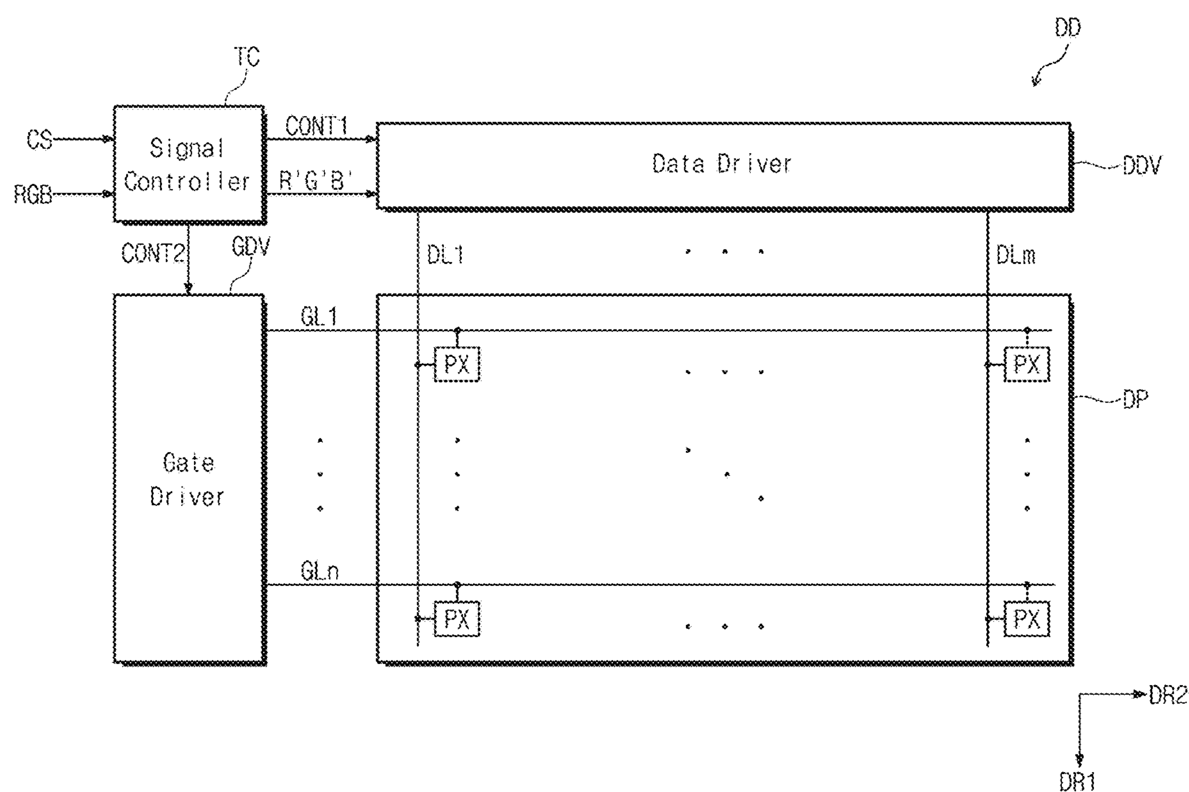
FIG. 1B is a block diagram illustrating a display device according to an exemplary embodiment of the invention.

FIG. 1B is a block diagram illustrating a display device DD according to an exemplary embodiment of the invention.

Referring to FIG. 1B, the display device DD may include a display panel DP, a signal controller (or a timing controller) TC, a data driver DDV, and a gate driver GDV. The signal controller TC, the data driver DDV, and the gate driver GDV may be formed as circuits.

The display panel DP may be a liquid crystal display panel. The display device DD may further include a backlight unit providing light to the display panel DP. The display panel DP may control a transmittance of light generated from the backlight unit to display an image.

The display panel DP may include a plurality of data lines DL1 to DLm, a plurality of gate lines GL1 to GLn, and a plurality of pixels PX.

The plurality of data lines DL1 to DLm may extend in the first direction DR1 and may be arranged in the second direction DR2 intersecting the first direction DR1. The plurality of gate lines GL1 to GLn may extend in the second direction DR2 and may be arranged in the first direction DR1. The plurality of data lines DL1 to DLm and the plurality of gate lines GL1 to GLn may define pixel areas, and the pixel PX for displaying an image may be provided in each of the pixel areas. Each of the pixels PX may include a pixel electrode and a pixel circuit electrically connected to the pixel electrode. The pixel circuit may further include a plurality of transistors.

The plurality of pixels PX may be arranged in a matrix form along the first direction DR1 and the second direction DR2. Each of the pixels PX may display one of primary colors or one of mixed colors. The primary colors may include a red color, a green color, and a blue color, and the mixed colors may include various colors, such as a white color, a yellow color, a cyan color, and a magenta color. However, the colors displayed by the pixels PX are not limited thereto. The signal controller TC may receive image data RGB from an external system. The signal controller TC may convert the image data RGB into conversion image data R'G'B' adapted to the display panel DP and may output or provide the conversion image data R'G'B' to the data driver DDV.

In addition, the signal controller TC may receive a control signal CS from the external system. The control signal CS may include a vertical sync signal, a horizontal sync signal, a main clock signal, and a data enable signal. The signal controller TC may provide a first control signal CONT1 to the data driver DDV and may provide a second control signal CONT2 to the gate driver GDV. The first control signal CONT1 may be a signal for controlling the data driver DDV, and the second control signal CONT2 may be a signal for controlling the gate driver GDV.

The data driver DDV may drive the plurality of data lines DL1 to DLm in response to the first control signal CONT1 received from the signal controller TC. The data driver DDV may be implemented as an independent integrated circuit and be electrically connected to one side of the display panel DP, or may be mounted directly on the display panel DP. In some exemplary embodiments, the data driver DDV may be implemented as a single chip or multiple chips.

The gate driver GDV may drive the gate lines GL1 to GLn in response to the second control signal CONT2 received from the signal controller TC. The gate driver GDV may be integrated in a predetermined area of the display panel DP. In this case, the gate driver GDV may be implemented as a circuit using an amorphous silicon gate (ASG) technique, which may include an amorphous silicon thin film transistor (a-Si TFT), an oxide semiconductor, a crystalline semiconductor, or a poly-crystalline semiconductor. Alternatively, the gate driver GDV may be implemented as an independent integrated circuit and be electrically connected to a side of the display panel DP.

When a gate on voltage is applied to one of the plurality of gate lines GL1 to GLn, switching transistors of pixels of one row connected to the gate line may be turned on. At this time, the data driver DDV may provide data driving signals to the data lines DL1 to DLm. The data driving signals supplied to the data lines DL1 to DLm may be applied to the pixels through the turned-on switching transistors.

Figure 2:
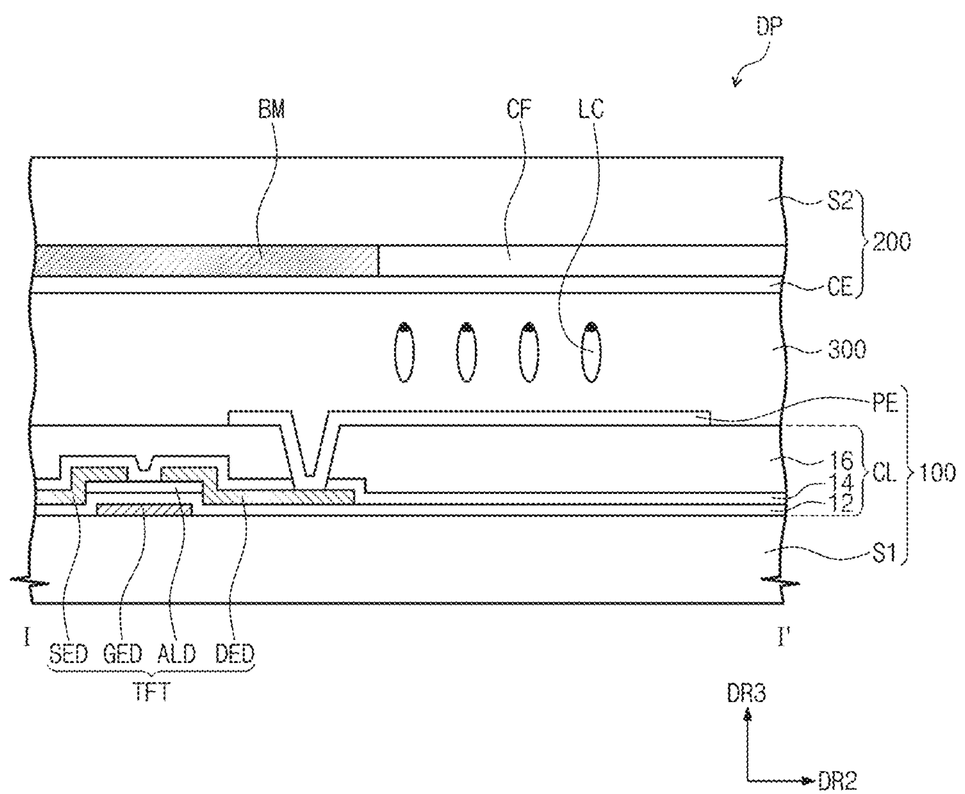
FIG. 2 is a cross-sectional view illustrating a display panel according to an exemplary embodiment of the invention.
Figure 3:
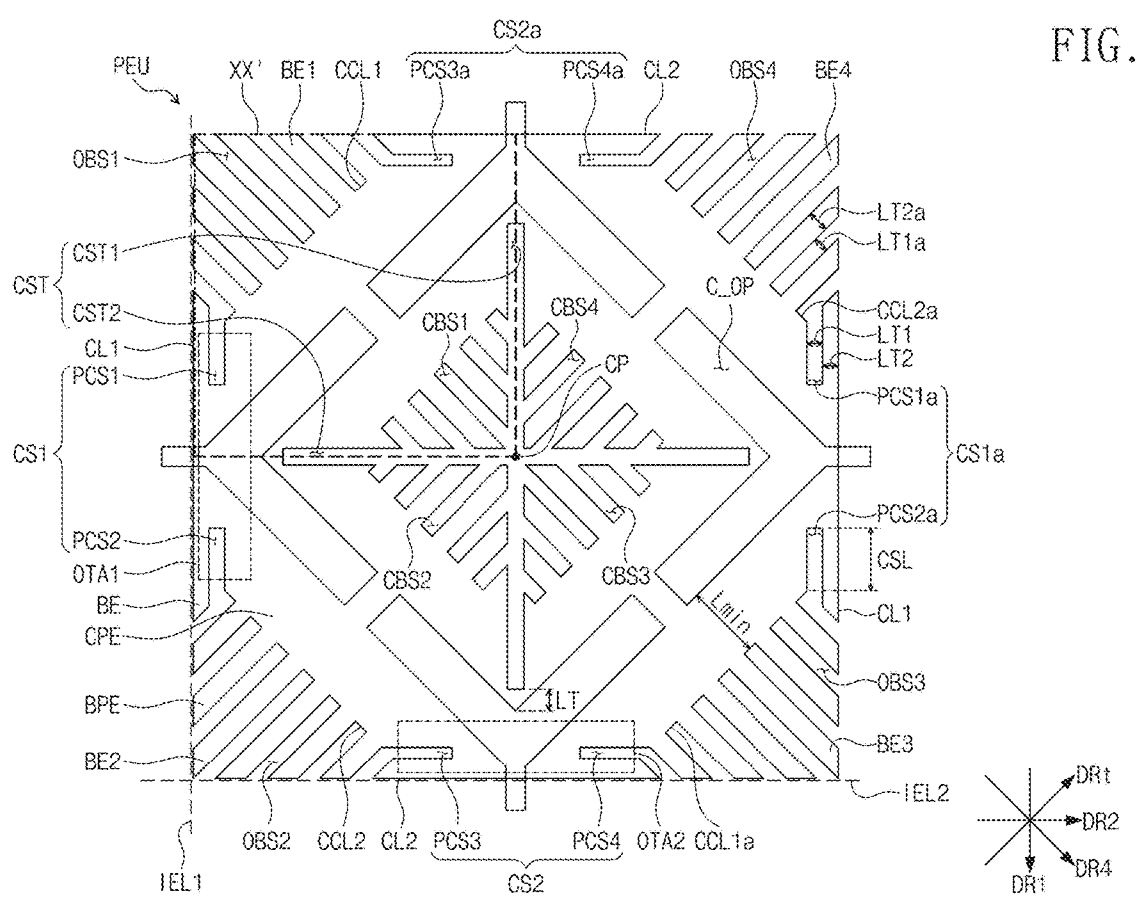
FIG. 3 is a plan view illustrating a unit pixel electrode according to an exemplary embodiment of the invention.

FIG. 2 is a cross-sectional view illustrating a display panel DP according to an exemplary embodiment of the invention, and FIG. 3 is a plan view illustrating a unit pixel electrode PEU according to an exemplary embodiment of the invention.

Referring to FIGS. 2 and 3, the display panel DP may include a first substrate 100, a second substrate 200, and a liquid crystal layer 300. The first substrate 100 may include a first base substrate S1, a circuit layer CL, and a pixel electrode PE.

The first base substrate S1 may include an insulating material. The first base substrate S1 may be optically transparent. Thus, light generated from the backlight unit (not shown) disposed under the first base substrate S1 may pass through the first base substrate S1 and provided to the liquid crystal layer 300. For example, the first base substrate S1 may include a plastic substrate, a glass substrate, a metal substrate, or an organic/inorganic composite substrate. When the first base substrate S1 includes the plastic substrate, the first base substrate S1 may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

The circuit layer CL may be disposed on the first base substrate S1. The circuit layer CL may include a plurality of insulating layers, a plurality of conductive layers, and a semiconductor layer. For example, the circuit layer CL may include organic/inorganic layers 12, 14, and 16, and a transistor TFT.

The transistor TFT may include a control electrode GED, a semiconductor pattern ALD, an input electrode SED, and an output electrode DED. Hereinafter, a structure of the transistor TFT illustrated in FIG. 2 will be described. However, the structure of the transistor TFT may be variously modified and is not limited to one exemplary embodiment.

The control electrode GED may be disposed on the first base substrate S1. Although not shown in FIG. 1, a functional layer such as a barrier layer or a buffer layer may be disposed between the first base substrate S1 and the control electrode GED. In this case, the control electrode GED may be disposed on the functional layer.

A first insulating layer 12 may be disposed on the first base substrate S1 to cover the control electrode GED. The first insulating layer 12 may include an organic layer and/or an inorganic layer. In particular, the first insulating layer 12 may include a plurality of inorganic thin layers. The plurality of inorganic thin layers may include a silicon nitride layer and a silicon oxide layer.

The semiconductor pattern ALD may be disposed on the first insulating layer 12. The semiconductor pattern ALD may include a semiconductor material. For example, the semiconductor material may include at least one of amorphous silicon, poly-crystalline silicon, single-crystalline silicon, an oxide semiconductor, and a compound semiconductor.

The input electrode SED and the output electrode DED may be disposed on the semiconductor pattern ALD. In FIG. 2, the input electrode SED and the output electrode DED are shown as being directly disposed on the semiconductor pattern ALD and are in contact with the semiconductor pattern ALD, however, the inventive concepts are not limited thereto. For example, an insulating layer may be disposed on the semiconductor pattern ALD, and the input electrode SED and the output electrode DED may be disposed on the insulating layer. In this case, the input electrode SED and the output electrode DED may penetrate the insulating layer and be electrically connected to the semiconductor pattern ALD.

A second insulating layer 14 may be disposed on the first insulating layer 12 to cover the input electrode SED and the output electrode DED. The second insulating layer 14 may include an organic layer and/or an inorganic layer. In particular, the second insulating layer 14 may include a plurality of inorganic thin layers. The plurality of inorganic thin layers may include a silicon nitride layer and a silicon oxide layer.

A third insulating layer 16 may be disposed on the second insulating layer 14. The third insulating layer 16 may include an organic layer and/or an inorganic layer. In particular, the third insulating layer 16 may include an organic material to provide a flat surface.

According to an exemplary embodiment, one of the first, second, and third insulating layers 12, 14 and 16 may be omitted according to a circuit structure of the pixel. Each of the first, second, and third insulating layers 12, 14, and 16 may be defined as an interlayer insulating layer. The interlayer insulating layer may be disposed between two conductive patterns to insulate the conductive patterns from each other.

The pixel electrode PE may be disposed on the third insulating layer 16. The pixel electrode PE may be provided in plurality. The plurality of pixel electrodes PE may be arranged along the first direction DR1 (see FIG. 1B) and the second direction DR2, similarly to the pixels PX described above with reference to FIG. 1B. The pixel electrode PE may penetrate the second and third insulating layers 14 and 16 and be electrically connected to the output electrode DED.

The pixel electrode PE may include a unit pixel electrode PEU. In some exemplary embodiments, the pixel electrode PE may include one unit pixel electrode PEU or two or more unit pixel electrodes PEU. The unit pixel electrode PEU will be described in more detail with reference to FIG. 3.

The unit pixel electrode PEU may include a central electrode portion CPE and a branch electrode portion BPE. The central electrode portion CPE may include a plurality of diagonal sides CCL1, CCL2, CCL1*a*, and CCL2*a* and a plurality of connection sides CL1 and CL2. In FIG. 3, each of the connection sides CL1 and CL2 may be defined as a side extending in the first direction DR1 or the second direction DR2. Each of the diagonal sides CCL1, CCL2, CCL1*a* and CCL2*a* may be defined as a side extending in a third direction DRt or a fourth direction DR4.

The third direction DRt may intersect the first direction DR1 and the second direction DR2, and the fourth direction DR4 may intersect the first to third directions DR1, DR2, and DRt. The third direction DRt of FIG. 3 is indicated by a reference designator "DRt", which is different from that the third direction DR3 corresponding to the thickness direction of the display device DD of FIG. 1A.

The plurality of connection sides CL1 and CL2 may include two first connection sides CL1 extending in the first direction DR1 and two second connection sides CL2 extending in the second direction DR2, respectively. The plurality of diagonal sides CCL1, CCL2, CCL1*a*, and CCL2*a* may include two first diagonal sides CCL1 and CCL1*a* extending in the third direction DRt, and two second diagonal sides CCL2 and CCL2*a* extending in the fourth direction DR4.

The central electrode portion CPE may have a contour line having an octagonal shape defined by the first connection sides CL1, the second connection sides CL2, the first diagonal sides CCL1 and CCL1*a*, and the second diagonal sides CCL2 and CCL2*a*.

A cross slit CST and a plurality of central branch slits CBS1, CBS2, CBS3, and CBS4 may be provided in the central electrode portion CPE. Each of the slits may be formed by removing a portion of the pixel electrode. For example, a component disposed under the central electrode portion CPE may be exposed through the slits provided in the central electrode portion CPE. For example, the third insulating layer 16 may be exposed through the slits provided in the central electrode portion CPE.

The cross slit CST may include a first straight slit CST1 extending in the first direction DR1 and a second straight slit CST2 extending in the second direction DR2. The first straight slit CST1 and the second straight slit CST2 may cross each other at a center CP of the central electrode portion CPE. Thus, the first straight slit CST1 and the second straight slit CST2 may constitute the cross slit CST having a cross shape.

The plurality of central branch slits CBS1 to CB S4 may extend from the cross slit CST. The plurality of central branch slits CBS1 to CBS4 may include first central branch slits CBS1, second central branch slits CBS2, third central branch slits CBS3, and fourth central branch slits CBS4 based on the areas divided by the cross slit CST.

The first central branch slits CBS1 may be slits that extend from a left side of the first straight slit CST1 and a top side of the second straight slit CST2 when viewed in a plan view. The second central branch slits CBS2 may be slits that extend from the left side of the first straight slit CST1 and a bottom side of the second straight slit CST2 when viewed in a plan view. The third central branch slits CBS3 may be slits that extend from a right side of the first straight slit CST1 and the bottom side of the second straight slit CST2 when viewed in a plan view. The fourth central branch slits CBS4 may be slits that extend from the right side of the first straight slit CST1 and the top side of the second straight slit CST2 when viewed in a plan view. By the first to fourth central branch slits CBS1, CBS2, CBS3, and CBS4, a horizontal electric field that may cause the liquid crystal molecules inclined or tilted in a specific direction may be formed.

The first central branch slits CBS1 and the third central branch slits CB S3 may extend in the fourth direction DR4, and the second central branch slits CBS2 and the fourth central branch slits CBS4 may extend in the third direction DRt. An imaginary line linking ends of the first to fourth central branch slits CBS1 to CBS4 may have a diamond shape when viewed in a plan view.

The first central branch slits CBS1 and the fourth central branch slits CBS4 may be asymmetrical with respect to the first straight slit CST1, and the second central branch slits CBS2 and the third central branch slits CBS3 may be asymmetrical with respect to the first straight slit CST1. In addition, the first central branch slits CBS1 and the second central branch slits CBS2 may be asymmetrical with respect to the second straight slit CST2, and the third central branch slits CBS3 and the fourth central branch slits CBS4 may be asymmetrical with respect to the second straight slit CST2. In this manner, a phenomenon of liquid crystal molecules colliding with each other may be reduced, as compared with a case when central branch slits are symmetrical with respect to the first straight slit CST1 or the second straight slit CST2. As such, a texture phenomenon may be reduced.

First control slits CS1 and CS1*a* extending in the first direction DR1 may be provided in first outer areas OTA1 of the central electrode portion CPE adjacent to the first connection sides CL1, respectively. In addition, second control slits CS2 and CS2*a* extending in the second direction DR2 may be provided in second outer areas OTA2 of the central electrode portion CPE adjacent to the second connection sides CL2, respectively. In FIG. 3, one of the first outer areas OTA1 and one of the second outer areas OTA2 are indicated by the reference designators OTA1 and OTA2. Descriptions of the other of the first outer areas and the other of the second outer areas will be omitted.

Each of the first outer areas OTA1 may be defined between a contour of the unit pixel electrode PEU and an end of the second straight slit CST2 extending in the second direction DR2, and each of the second outer areas OTA2 may be defined between the contour of the unit pixel electrode PEU and an end of the first straight slit CST1 extending in the first direction DR1. The contour of the unit pixel electrode PEU may be the first connection side CL1 or the second connection side CL2. In other words, each of the first outer areas OTA1 may be defined between each of the first connection sides CL1 and the end of the second straight slit CST2, and each of the second outer areas OTA2 may be defined between each of the second connection sides CL2 and the end of the first straight slit CST1.

The first control slit CS1 may include a first partial control slit PCS1 and a second partial control slit PCS2, which extend from two diagonal sides CCL1 and CCL2 adjacent to the first connection side CL1, in parallel with the first direction DR1, respectively. The first control slit CS1*a* may include a first partial control slit PCS1*a* and a second partial control slit PCS2*a*, which extend from two diagonal sides CCL1*a* and CCL2*a* adjacent to the first connection side CL1, in parallel with the first direction DR1, respectively.

The first partial control slit PCS1 may extend in a direction from the first diagonal side CCL1 toward the second diagonal side CCL2, and the second partial control slit PCS2 may extend in a direction from the second diagonal side CCL2 toward the first diagonal side CCL1. The first partial control slit PCS1*a* may extend in a direction from the second diagonal side CCL2*a* toward the first diagonal side CCL1*a*, and the second partial control slit PCS2*a* may extend in a direction from the first diagonal side CCL1*a* toward the second diagonal side CCL2*a*.

The second control slit CS2 may include a first partial control slit PCS3 and a second partial control slit PCS4, which extend from two diagonal sides CCL2 and CCL1*a* adjacent to the second connection side CL2, in parallel with the second direction DR2, respectively. The second control slit CS2*a* may include a first partial control slit PCS3*a* and a second partial control slit PCS4*a*, which extend from two diagonal sides CCL1 and CCL2*a* adjacent to the second connection side CL2, in parallel with the second direction DR2, respectively.

The first partial control slit PCS3 may extend in a direction from the second diagonal side CCL2 toward the first diagonal side CCL1*a*, and the second partial control slit PCS4 may extend in a direction from the first diagonal side CCL1*a* toward the second diagonal side CCL2. The first partial control slit PCS3*a* may extend in a direction from the first diagonal side CCL1 toward the second diagonal side CCL2*a*, and the second partial control slit PCS4*a* may extend in a direction from the second diagonal side CCL2*a* toward the first diagonal side CCL1.

The branch electrode portion BPE may include a plurality of branch electrodes BE1, BE2, BE3, and BE4. The plurality of branch electrodes BE1, BE2, BE3, and BE4 may extend from the plurality of diagonal sides CCL1, CCL2, CCL1*a*, and CCL2*a*.

A plurality of outer branch slits OBS1, OBS2, OBS3, and OBS4 may be provided between the plurality of branch electrodes BE1, BE2, BE3, and BE4. The plurality of outer branch slits OBS1 to OBS4 may extend from the contour of the unit pixel electrode PEU toward the plurality of central branch slits CBS1 to CBS4.

The plurality of branch electrodes BE1 to BE4 may be first branch electrodes BE1, second branch electrodes BE2, third branch electrodes BE3, and fourth branch electrodes BE4 based on the areas divided by the cross slit CST.

The plurality of outer branch slits OBS1 to OBS4 may include first outer branch slits OBS1 provided between the first branch electrodes BE1, second outer branch slits OBS2 provided between the second branch electrodes BE2, third outer branch slits OBS3 provided between the third branch electrodes BE3, and fourth outer branch slits OBS4 provided between the fourth branch electrodes BE4.

The first branch electrodes BE1 may protrude from the first diagonal side CCL1 along the fourth direction DR4, and the second branch electrodes BE2 may protrude from the second diagonal side CCL2 along the third direction DRt. The third branch electrodes BE3 may protrude from the first diagonal side CCL1*a* along the fourth direction DR4, and the fourth branch electrodes BE4 may protrude from the second diagonal side CCL2*a* along the third direction DRt.

A width LT1 of each of the first and second control slits CS1, CS1*a*, CS2, and CS2*a* may be substantially equal to a width LT1*a* of each of the plurality of outer branch slits OBS1 to OBS4. The width LT1*a* may be substantially equal to a distance between adjacent two of the plurality of branch electrodes BE1 to BE4.

The minimum distance LT2 between the first connection side CL1 and each of the first control slits CS1 and CS1*a* may be substantially equal to a width LT2*a* of each of the plurality of branch electrodes BE1 to BE4.

The bar electrode BE may be a portion of the central electrode portion CPE defined by each of the first and second control slits CS1, CS1*a*, CS2, and CS2*a*. For example, the bar electrodes BE may be defined as a portion between the first connection side CL1 adjacent to the contour of the central electrode portion CPE and the first partial control slit PCS1 or PCS1*a*, a portion between the first connection side CL1 and the second partial control slit PCS2 or PCS2*a*, a portion between the second connection side CL2 and the first partial control slit PCS3 or PCS3*a*, and a portion between the second connection side CL2 and the second partial control slit PCS4 or PCS4*a*. The minimum distance LT2 may be substantially equal to a width LT2 of a bar electrode BE.

An imaginary extension line of each of the connection sides CL1 and CL2 may be defined to extend along each of the connection sides CL1 and CL2. For example, an imaginary extension line IEL1 of the first connection side CL1 may extend in the first direction DR1, which is substantially the same as an extending direction of the first connection side CL1. An imaginary extension line IEL2 of the second connection side CL2 may extend in the second direction DR2, which is substantially the same as an extending direction of the second connection side CL2. Ends of the plurality of branch electrodes BE1 to BE4 may be disposed on the imaginary extension lines IEL1 and IEL2.

The first control slits CS1 and CS1*a* may not overlap with the plurality of outer branch slits OBS1 to OBS4 when viewed in the second direction DR2. The second control slits CS2 and CS2*a* may not overlap with the plurality of outer branch slits OBS1 to OBS4 when viewed in the first direction DR1. In other words, the bar electrodes BE may not face ends of the plurality of outer branch slits OBS1 to OBS4.

In this case, collisions between the liquid crystal molecules LC caused by the rotation of the liquid crystal molecules LC at ends of the branch electrodes BE1 to BE4 may be reduced as compared with a case when a bar electrode is disposed outside the outer branch slits OBS1 to OBS4. In this manner, a response speed of the liquid crystal molecules LC and a transmittance thereof may be prevented from being reduced.

As illustrated in FIG. 2, the second substrate 200 may include a second base substrate S2, a color filter CF, a light shielding layer BM, and a common electrode CE.

The second base substrate S2 may be an optically transparent insulating substrate. The second base substrate S2 may include the same material as the first base substrate S1. Thus, the descriptions thereto will be omitted.

The common electrode CE may form an electric field with the pixel electrode PE. Thus, arrangement of liquid crystal molecules LC of the liquid crystal layer 300 may be changed depending on the electric field formed between the common electrode CE and the pixel electrode PE. An opening pattern C_OP may be provided in the common electrode CE. The opening pattern C_OP is illustrated in FIG. 3.

The opening pattern C_OP may be disposed to overlap with an area between the plurality of central branch slits CBS1 to CB S4 and the plurality of outer branch slits OBS1 to OBS4 when viewed in a plan view. The opening pattern C_OP may not overlap with the cross slit CST, the plurality of central branch slits CBS1 to CBS4, and the plurality of outer branch slits OBS1 to OBS4 when viewed in a plan view.

According to an exemplary embodiment of the invention, the opening pattern C_OP may be spaced apart from the cross slit CST by a predetermined distance or more when viewed in a plan view. For example, a distance LT between the opening pattern C_OP and the cross slit CST in a plan view may be about 3 micrometers (μm) or more. In this manner, a change in transmittance which may occur when the first substrate 100 is misaligned with the second substrate 200 may be reduced or minimized.

The distance LT between the opening pattern C_OP and the cross slit CST may be a distance LT between an end of the cross slit CST in an extending direction of the cross slit CST and the opening pattern C_OP adjacent to the end when viewed in a plan view. In addition, the distance LT may refer to a maximum distance in the extending direction of the cross slit CST. FIG. 3 illustrates the maximum distance LT in the first direction DR1 between the opening pattern C_OP and the first straight slit CST1 extending in the first direction DR1.

A length CSL of each of the first and second partial control slits PCS1, PCS2, PCS3, PCS4, PCS1*a*, PCS2*a*, PCS3*a*, and PCS4*a* may be less than $\chi\sqrt{2}$, which will be described in more detail below with reference to the second partial control slit PCS2*a*

For example, the length CSL of the second partial control slit PCS2*a* may be a length CSL from the first diagonal side CCL1*a* to an end of the second partial control slit PCS2*a*, and '$\chi$' may be a minimum distance Lmin between one diagonal side (e.g., CCL1*a*) and the opening pattern C_OP when viewed in a plan view. Thus, the first and second partial control slits PCS1, PCS2, PCS3, PCS4, PCS1*a*, PCS2*a*, PCS3*a*, and PCS4*a* may not overlap with the opening pattern C_OP when viewed in a plan view.

The light shielding layer BM may be disposed to overlap with the transistor TFT. The light shielding layer BM may prevent the transistor TFT from being visible to the outside and may block light leaked through the transistor TFT.

The color filter CF may be disposed to overlap with the pixel electrode PE. The color filter CF may convert light provided thereto into colored light, and provide the colored light to the outside.

Meanwhile, according to an exemplary embodiment, the first substrate 100 may further include at least one of the common electrode CE, the color filter CF, or the light shielding layer BM disposed on the first base substrate S1. The structure of the display panel DP according to an exemplary embodiment may be variously modified or changed and may not be limited to one exemplary embodiment.

In addition, an alignment layer may be disposed between the liquid crystal layer 300 and at least one of the pixel electrode PE or the common electrode CE. Furthermore, a polarizing plate may be disposed under the first base substrate S1 and/or on the second base substrate S2.

The liquid crystal layer 300 may be disposed between the first substrate 100 and the second substrate 200. The liquid crystal layer 300 may include the liquid crystal molecules LC. Long axes of the liquid crystal molecules LC may be aligned substantially in parallel with the third direction DR3 when an electric field is not formed between the pixel electrode PE and the common electrode CE. However, the inventive concepts are not limited thereto, and the long axes of the liquid crystal molecules LC may be aligned at a predetermined pretilt angle with respect to the third direction DR3.

When a potential difference is provided between the pixel electrode PE and the common electrode CE to form an electric field in the liquid crystal layer 300, the long axes of the liquid crystal molecules LC may be arranged or aligned in a direction substantially perpendicular to the electric field. The degree of change in polarization of light incident to the liquid crystal layer 300 may be varied depending on the degree of inclination of the liquid crystal molecules LC, which may change light transmittance.

Figure 4:
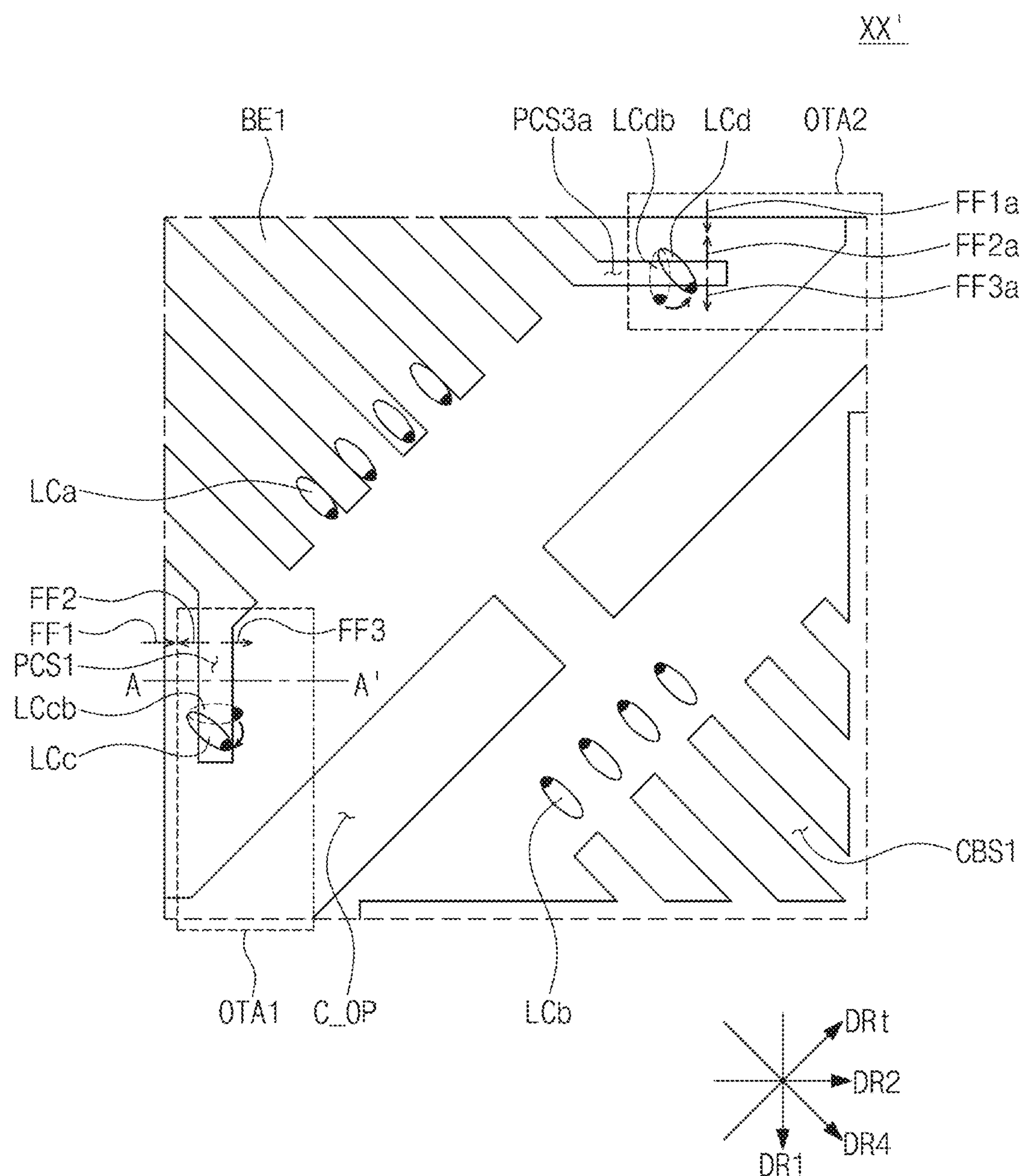
FIG. 4 is an enlarged view of a portion of FIG. 3.

FIG. 4 is an enlarged view of a portion XX' of FIG. 3. In detail, FIG. 4 is an enlarged view of a portion disposed at a left side of the first straight slit CST1 and a top side of the second straight slit CST2 in FIG. 3.

FIG. 4 schematically illustrates an alignment of liquid crystal molecules. A horizontal electric field may be formed by the first branch electrodes BE1, and liquid crystal molecules in an area where the first branch electrodes BE1 are disposed may be inclined in directions similar to each other. FIG. 4 illustrates four first liquid crystal molecules LCa located in the area where the first branch electrodes BE1 are disposed as an example. A head of each of the first liquid crystal molecules LCa are shown with darker area. The head of the first liquid crystal molecule LCa may refer to a portion of the first liquid crystal molecule LCa adjacent to the second substrate 200 (see FIG. 2) when viewed in a cross-sectional view. As used herein, a head of a liquid crystal molecule indicated with darker area is merely for illustrative purposes and does not actually exist.

A horizontal electric field may be formed by the first central branch slits CBS1, and liquid crystal molecules in an area where the first central branch slits CBS1 are disposed may be inclined in directions substantially similar to each other. FIG. 4 also illustrates four second liquid crystal molecules LCb located in the area where the first central branch slits CBS1 are disposed as an example.

Each of the first and second liquid crystal molecules LCa and LCb may be inclined in a direction toward the opening pattern C_OP. As such, multiple domains may be formed by the opening pattern C_OP in the area defined by the first straight slit CST1 and the second straight slit CST2. For example, the unit pixel electrode PEU of FIG. 3 may be divided into eight domains by the first straight slit CST1, the second straight slit CST2, and the opening pattern C_OP. The directions to which the liquid crystal molecules are inclined may be uniformly dispersed by a plurality of the domains, and thus side visibility of the display device may be improved.

Liquid crystal molecules LCc and LCd respectively disposed in the first and second outer areas OTA1 and OTA2 may be controlled by the first and second control slits CS1, CS1*a*, CS2, and CS2*a*.

Fringe fields may be formed in the first and second outer areas OTA1 and OTA2 by the first and second control slits CS1, CS1*a*, CS2, and CS2*a*. FIG. 4 illustrates horizontal electric field components of the fringe fields, which move the liquid crystal molecules LCc and LCd.

A first horizontal electric field FF1, a second horizontal electric field FF2, and a third horizontal electric field FF3 may be formed in the first outer area OTA1. The second horizontal electric field FF2 and the third horizontal electric field FF3 may be formed by the first partial control slit PCS1. The first horizontal electric field FF1 and the second horizontal electric field FF2 may offset each other. Thus, a liquid crystal molecule adjacent to the first partial control slit PCS1 may be first-aligned by the third horizontal electric field FF3 in a direction perpendicular to the extending direction of the first partial control slit PCS1, as shown in the first-aligned liquid crystal molecule LCcb of FIG. 4 illustrated with a dotted line. The first-aligned liquid crystal molecule LCcb may be second-aligned in a direction that may require minimal change of direction in accordance with adjacent liquid crystal molecules (e.g., the first liquid crystal molecules LCa). The second-aligned liquid crystal molecule LCc is illustrated by a full line in FIG. 4.

A first horizontal electric field FF1*a*, a second horizontal electric field FF2*a*, and a third horizontal electric field FF3*a* may be formed in the second outer area OTA2. The second horizontal electric field FF2*a* and the third horizontal electric field FF3*a* may be formed by the first partial control slit PCS3*a*. The liquid crystal molecule adjacent to the first partial control slit PCS3*a* may be first-aligned by the third horizontal electric field FF3*a* in a direction perpendicular to the extending direction of the first partial control slit PCS3*a*, as shown in the first-aligned liquid crystal molecule LCdb of FIG. 4 illustrated with a dotted line. The first-aligned liquid crystal molecule LCdb may be second-aligned in a direction that may require minimal change of direction in accordance with adjacent liquid crystal molecules (e.g., the first liquid crystal molecules LCa). The second-aligned liquid crystal molecule LCd is illustrated by a full line in FIG. 4.

Figure 5:
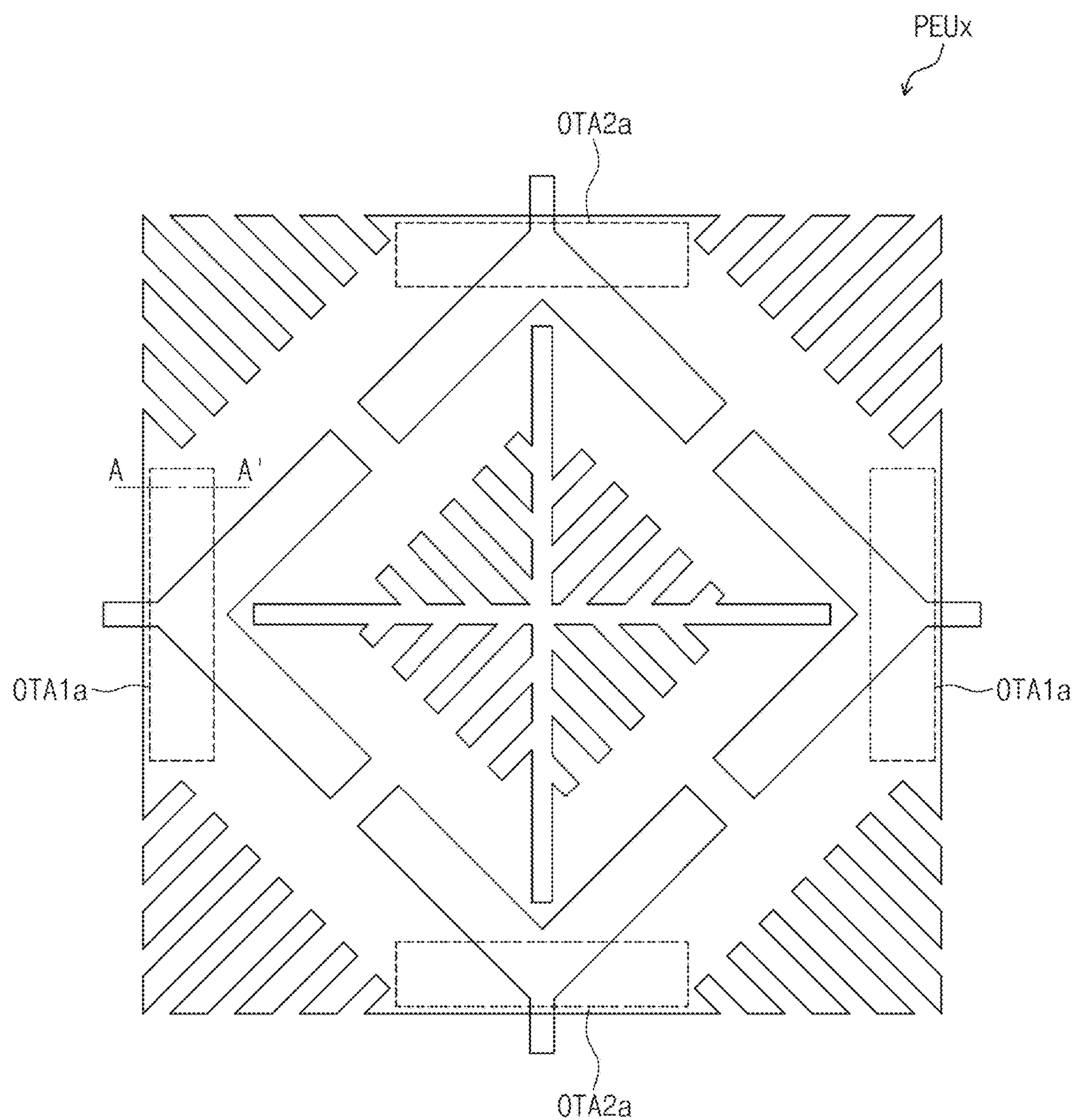
FIG. 5 is a plan view illustrating a unit pixel electrode according to a comparative embodiment.

FIG. 5 is a plan view illustrating a unit pixel electrode PEUx according to a comparative embodiment.

Referring to FIG. 5, in the unit pixel electrode PEUx according to the comparative embodiment, the first and second control slits CS1, CS1*a*, CS2, and CS2*a* (see FIG. 3) described above may not be provided in first outer areas OTA1*a* and second outer areas OTA2 of the unit is pixel electrode PEUx. Thus, the second horizontal electric field FF2 and the third horizontal electric field FF3 described above with reference to FIG. 4 may not be formed.

Figure 6:
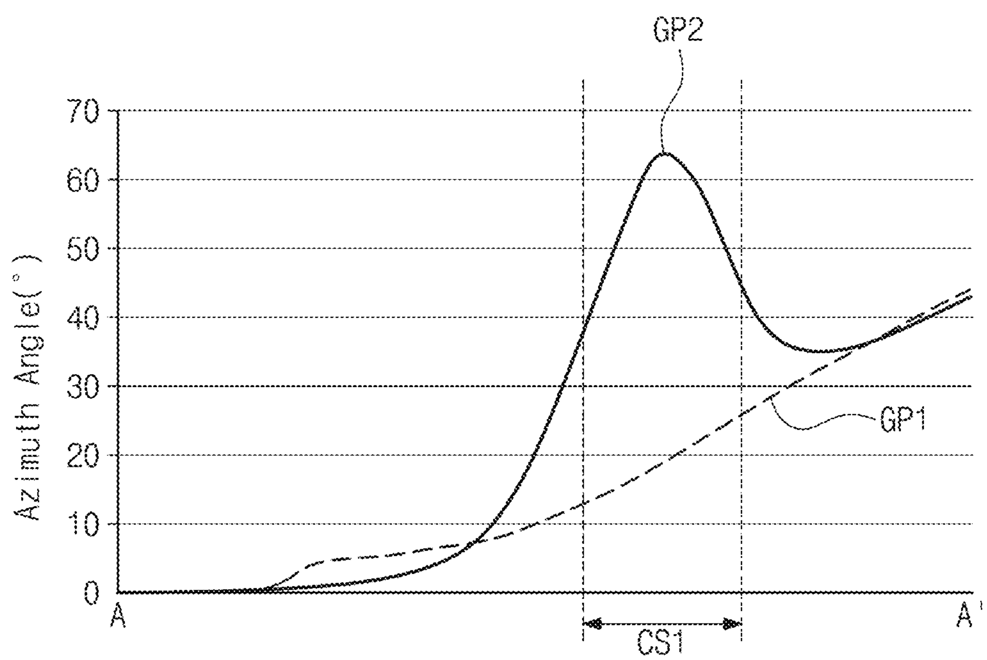
FIG. 6 is a graph showing alignment angles (e.g., azimuth angles) of liquid crystal molecules disposed along lines A-A' of FIGS. 4 and 5.

FIG. 6 is a graph showing alignment angles (e.g., azimuth angles) of liquid crystal molecules disposed along lines A-A' of FIGS. 4 and 5.

Hereinafter, a display device according to an exemplary embodiment will be described in more detail with reference to FIGS. 3 to 6. The graph in FIG. 6 shows azimuth angles of liquid crystal molecules measured when a predetermined voltage (e.g., 8V) is applied to the unit pixel electrode. The azimuth angles of the liquid crystal molecules in the graph may be angles with respect to the second direction DR2.

A transmittance may be reduced by liquid crystal molecules lying in a direction parallel to a polarization axis of a polarizing plate (not shown). For example, the transmittance may decrease as the azimuth angle of the liquid crystal molecule becomes closer to 0 degree or 90 degrees, and the transmittance may have the highest value when the azimuth angle of the liquid crystal molecule is 45 degrees.

A first graph GP1 shows the azimuth angles of liquid crystal molecules according to the comparative embodiment, and a second graph GP2 shows the azimuth angles of the liquid crystal molecules according to an exemplary embodiment of the invention.

Referring to the first graph GP1, the azimuth angle of the liquid crystal molecules according to an exemplary embodiment may gradually increase from 0 degree toward 45 degrees along point A to point A'. In this case, the transmittance of light may be reduced in an area where the azimuth angles of the liquid crystal molecules are less than 45 degrees.

Referring to the second graph GP2, the azimuth angle of the liquid crystal molecules according to the comparative embodiment may increase along point A toward the area having the first control slit CS1 and may decrease from the area having the first control slit CS1 toward point A'.

In particular, according to the exemplary embodiments of the invention, the azimuth angles of the liquid crystal molecules may be adjusted in the outer areas of the unit pixel electrode PEU by the first and second control slits CS1, CS1*a*, CS2, and CS2*a* (see FIG. 3) to have angles close to 45 degrees. As such, reduction of the transmittance in the outer areas of the unit pixel electrode PEU may be substantially reduced or prevented. As such, the display panel according to an exemplary embodiment may have improved transmittance and side visibility.

Figure 7A:
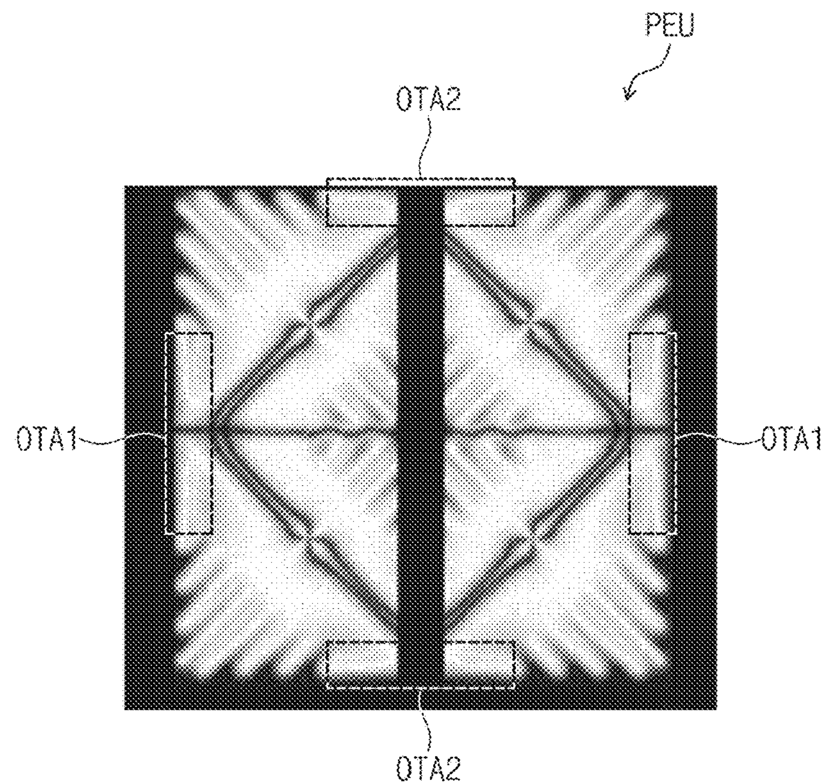
FIG. 7A is a planar image showing a unit pixel electrode according to an exemplary embodiment of the invention.
Figure 7B:
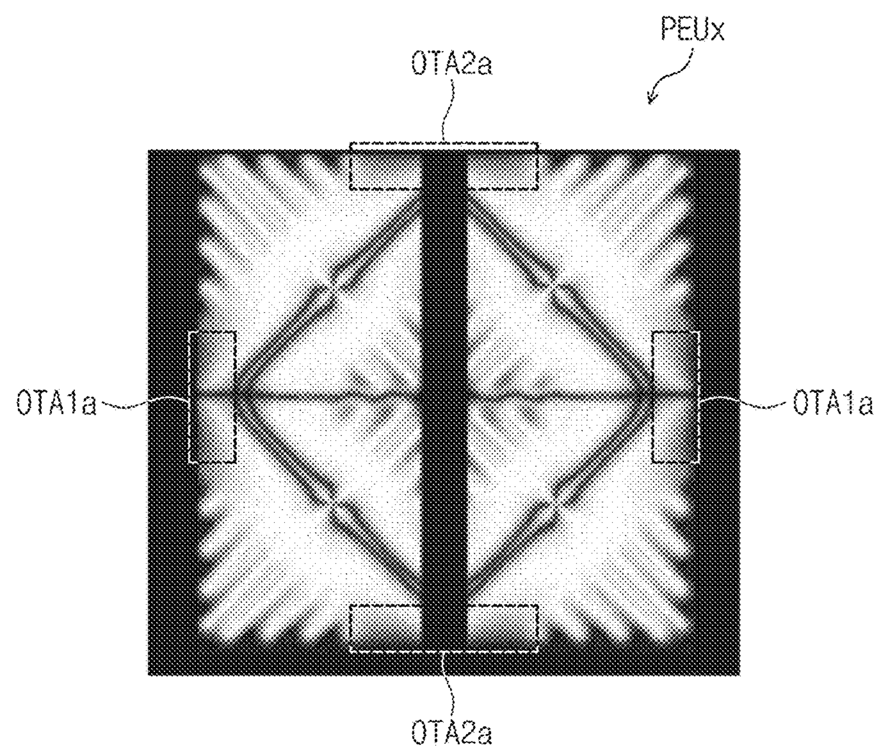
FIG. 7B is a planar image showing a unit pixel electrode according to a comparative embodiment.

FIG. 7A is a planar image showing a unit pixel electrode PEU according to an exemplary embodiment of the invention, and FIG. 7B is a planar image showing a unit pixel electrode PEUx according to a comparative embodiment. Areas corresponding to the first and second outer areas OTA1 and OTA2 of FIG. 7A are represented as first and second outer areas OTA1*a* and OTA2*a* in FIG. 7B.

As can be seen in FIGS. 7A and 7B, the first and second outer areas OTA1 and OTA2 of FIG. 7A are shown to be brighter than the first and second outer areas OTA1*a* and OTA2*a* of FIG. 7B, respectively, and thus, the display device according to an exemplary embodiment has an improved transmittance over that in the comparative embodiment.

In addition, a gamma distortion index (GDI) of the unit pixel electrode PEU of FIG. 7A was 0.27, and a GDI of the unit pixel electrode PEUx according to the comparative embodiment of FIG. 7B was 0.275. Since the GDI is an index showing a distorted value, visibility may become worse as the GDI increases, and the visibility may become better as the GDI decreases. As such, the display device according to an exemplary embodiment has improved side visibility by forming the first and second control slits CS1, CS2, CS1*a*, and CS2*a* (see FIG. 3) in the first and second outer areas OTA1 and OTA2.

Figure 8:
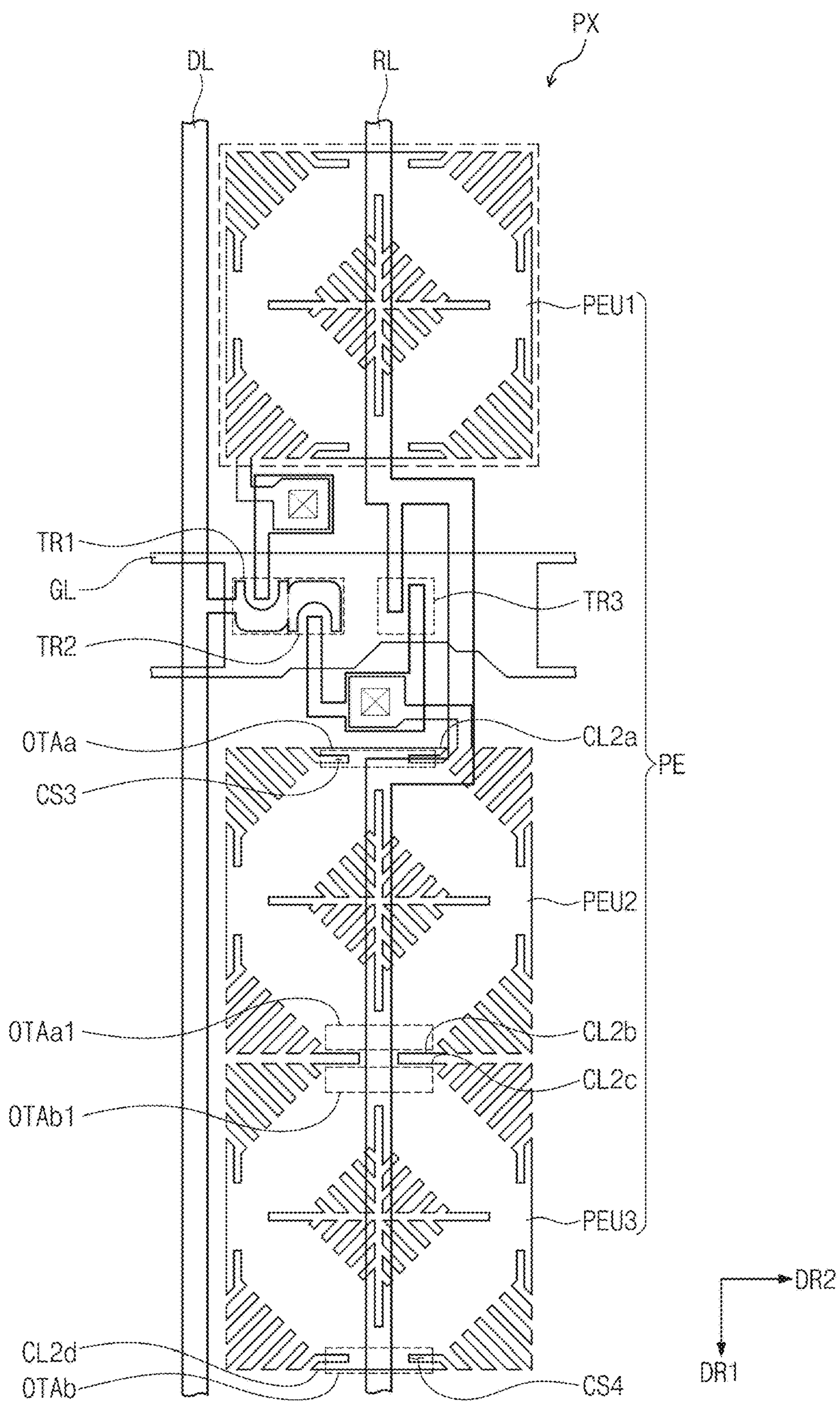
FIG. 8 is a plan view illustrating a pixel according to an exemplary embodiment of the invention.

FIG. 8 is a plan view illustrating a pixel according to an exemplary embodiment of the invention.

Referring to FIG. 8, a pixel PX may include a pixel electrode PE and a pixel driving circuit TR1, TR2, and TR3.

The pixel electrode PE may include three unit pixel electrodes PEU1, PEU2, and PEU3. The unit pixel electrodes PEU1, PEU2, and PEU3 may be arranged in the first direction DR1. The unit pixel electrodes PEU1, PEU2, and PEU3 may include a first unit pixel electrode PEU1, a second unit pixel electrode PEU2, and a third unit pixel electrode PEU3, which are defined based on the arranged order thereof.

The first unit pixel electrode PEU1 may be a high gray scale sub-pixel receiving a relatively high data voltage, and the second and third unit pixel electrodes PEU2 and PEU3 may be low gray scale sub-pixels receiving a relatively low data voltage.

The pixel driving circuit TR1, TR2, and TR3 may be disposed between the first unit pixel electrode PEU1 and the second unit pixel electrode PEU2. The pixel driving circuit TR1, TR2, and TR3 may include a first transistor TR1, a second transistor TR2, and a third transistor TR3. The transistor TFT described above with reference to FIG. 2 may be the first transistor TR1 or the second transistor TR2.

Control electrodes of the first and second transistors TR1 and TR2 may be electrically connected to the same gate line GL, and input electrodes of the first and second transistors TR1 and TR2 may be electrically connected to the same data line DL.

An output electrode of the first transistor TR1 may be electrically connected to the first unit pixel electrode PEU1, and an output electrode of the second transistor TR2 may be electrically connected to the second unit pixel electrode PEU2 and the third unit pixel electrode PEU3.

A retention line RL may be disposed under the first, second, and third unit pixel electrodes PEU1, PEU2 and PEU3. A retention voltage may be provided to the retention line RL. The retention voltage may be defined as a resistance dividing voltage.

The data voltage transmitted to the second and third unit pixel electrodes PEU2 and PEU3 may be voltage-divided depending on an internal resistance of the third transistor TR3 and the retention voltage applied to the retention line RL. The third transistor TR3 may be defined as a resistance dividing transistor TR3.

The first unit pixel electrode PEU1 may have the same shape as the unit pixel electrode PEU described above with reference to FIGS. 3 and 4. However, shapes of the second and third unit pixel electrodes PEU2 and PEU3 may be different from that of the unit pixel electrode PEU.

In the second unit pixel electrode PEU2, among the second connection sides CL2*a* and CL2*b*, a third control slit CS3 may be provided only in a third outer area OTAa adjacent to the second connection side CL2*a*, which is not adjacent to the third unit pixel electrode PEU3. In other words, a control slit may not be provided in an outer area OTAa1 adjacent to the second connection side CL2*b* adjacent to the third unit pixel electrode PEU3.

Likewise, in the third unit pixel electrode PEU3, among the second connection sides CL2*c* and CL2*d*, a fourth control slit CS4 may be provided only in a fourth outer area OTAb adjacent to the second connection side CL2*d*, which is not adjacent to the second unit pixel electrode PEU2. In other words, a control slit may not be provided in an outer area OTAb1 adjacent to the second connection side CL2*c* adjacent to the second unit pixel electrode PEU2.

The second and third unit pixel electrodes PEU2 and PEU3 may be disposed adjacent to each other. Thus, even though the control slits are provided in the outer area OTAa1 of the second unit pixel electrode PEU2 and the outer area OTAb1 of the third unit pixel electrode PEU3, electric fields formed by the control slits may offset each other. Therefore, control slits may not be provided in the outer area OTAa1 of the second unit pixel electrode PEU2 and the outer area OTAb1 of the third unit pixel electrode PEU3.

Figure 9:
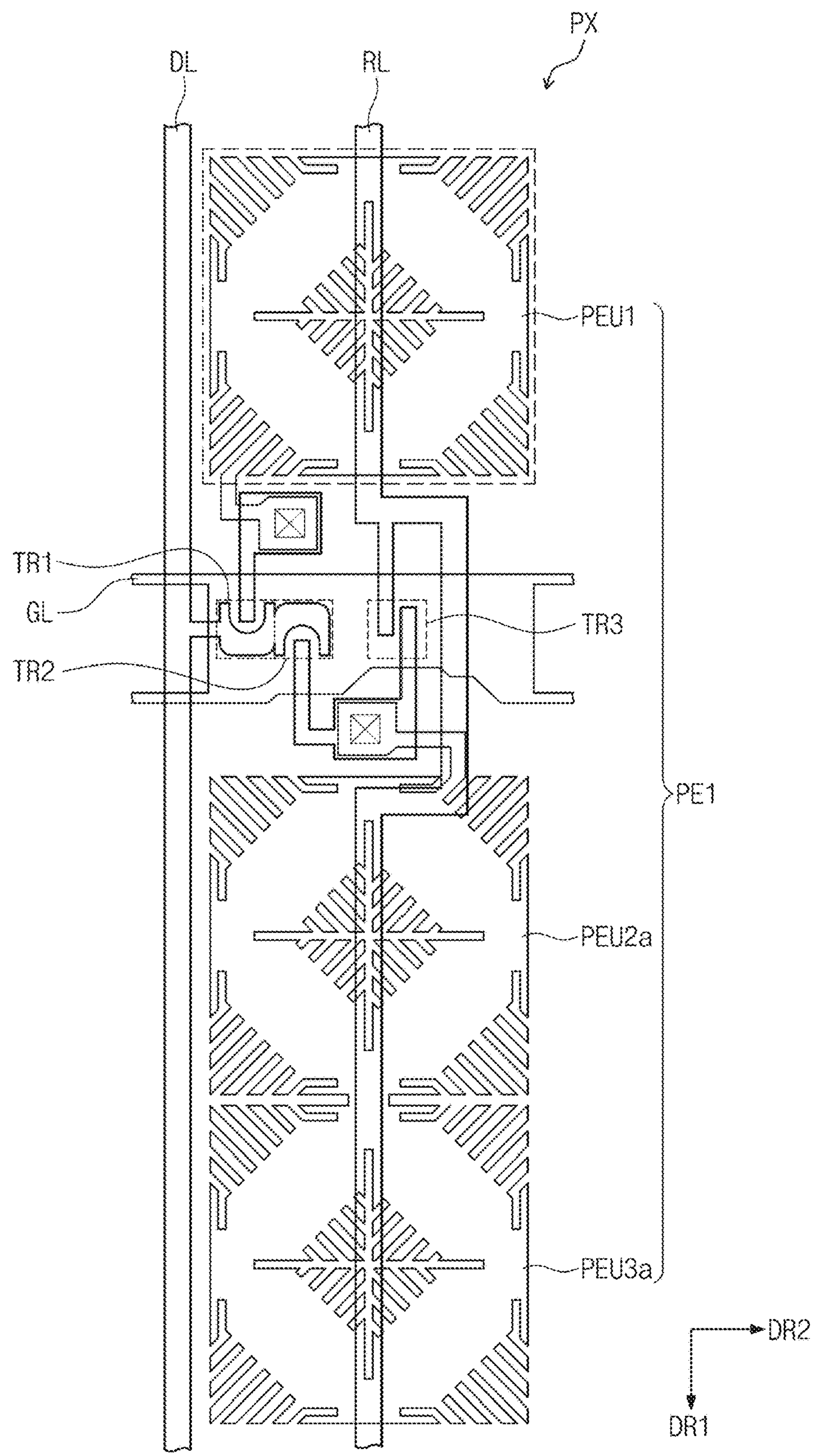
FIG. 9 is a plan view illustrating a pixel electrode according to an exemplary embodiment of the invention.

FIG. 9 is a plan view illustrating a pixel electrode according to an exemplary embodiment of the invention. In FIG. 9, the same components as those in the embodiment of FIG. 8 will be indicated by the same reference designators, and thus, repeated descriptions thereof will be omitted to avoid redundancy.

Referring to FIG. 9, a pixel electrode PE1 may include three unit pixel electrodes PEU1, PEU2*a*, and PEU3*a*. The unit pixel electrodes PEU1, PEU2*a*, and PEU3*a* may be arranged in the first direction DR1. The unit pixel electrodes PEU1, PEU2*a*, and PEU3*a* may include a first unit pixel electrode PEU1, a second unit pixel electrode PEU2*a*, and a third unit pixel electrode PEU3*a*, which are defined based on the arranged order thereof.

Each of the first, second, and third unit pixel electrodes PEU1, PEU2*a*, and PEU3*a* may have the same shape as the unit pixel electrode PEU described above with reference to FIGS. 3 and 4.

Figure 10:
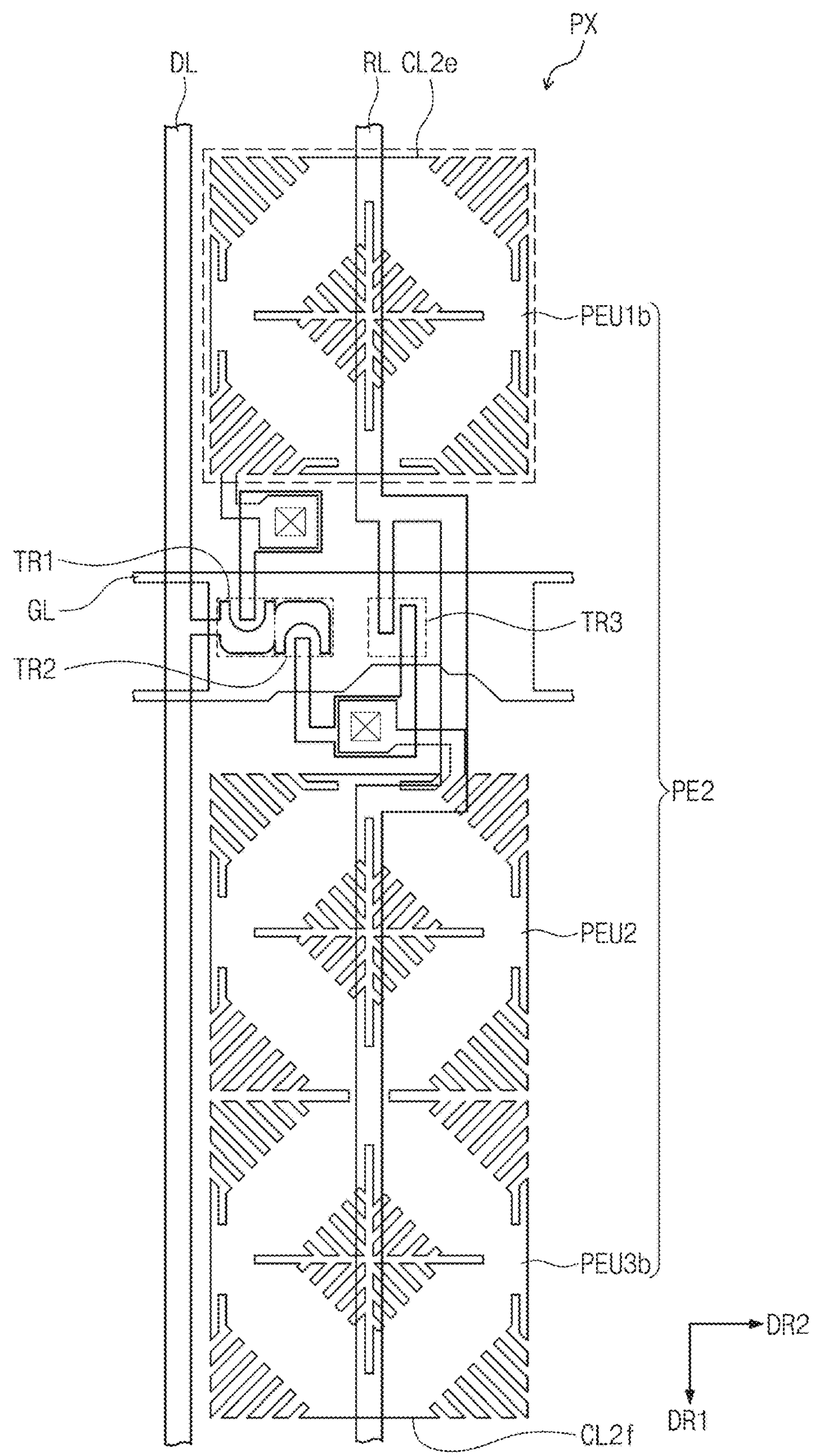
FIG. 10 is a plan view illustrating a pixel electrode according to an exemplary embodiment of the invention.

FIG. 10 is a plan view illustrating a pixel electrode according to an exemplary embodiment of the invention. In FIG. 10, the same components as those in the embodiment of FIG. 8 will be indicated by the same reference designators, and thus, repeated descriptions thereof will be omitted to avoid redundancy.

Referring to FIG. 10, a pixel electrode PE2 may include three unit pixel electrodes PEU1*b*, PEU2, and PEU3*b*. The unit pixel electrodes PEU1*b*, PEU2, and PEU3*b* may be arranged in the first direction DR1. The unit pixel electrodes PEU1*b*, PEU2, and PEU3*b* may include a first unit pixel electrode PEU1*b*, a second unit pixel electrode PEU2, and a third unit pixel electrode PEU3*b*, which are defined based on the arranged order thereof.

The first and third unit pixel electrodes PEU1*b* and PEU3*b* of FIG. 10 are different from the first and third unit pixel electrodes PEU1 and PEU3 of FIG. 8. More particularly, a control slit may not be provided in respective outer areas adjacent to a second connection side CL2*e* of the first unit pixel electrode PEU1*b* and a second connection side CL2*f* of the third unit pixel electrode PEU3*b*, which form at an outermost contour of the pixel electrode PE2.

The pixel electrode PE2 may be provided in plurality, and the plurality of pixel electrodes PE2 may be arranged in a matrix form along the first direction DR1 and the second direction DR2. In this case, the second connection side CL2*e* of the first unit pixel electrode PEU1*b* of one pixel electrode PE2 may be adjacent to the second connection side CL2*f* of the third unit pixel electrode PEU3*b* of another pixel electrode PE2 adjacent to the one pixel electrode PE2. In other words, even though control slits are provided in outer areas adjacent to the second connection sides CL2*e* and CL2*f*, electric fields formed by the control slits may offset each other. Thus, control slits may not be provided in the outer areas adjacent to the second connection sides CL2*e* and CL2*f*.

According to the exemplary embodiments, the control slit may be formed in the outer area of the unit pixel electrode to form a predetermined electric field. In this manner, the liquid crystal molecules disposed in the outer area may be controlled by the predetermined electric field. As such, the alignment angles (e.g., the azimuth angles) of the liquid crystal molecules disposed in the outer area may be changed by the predetermined electric field, and thus the transmittance and side visibility of the display device may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a first substrate comprising a plurality of pixel electrodes arranged in a first direction and a second direction intersecting the first direction, each of the pixel electrodes comprising a unit pixel electrode;

a second substrate comprising a common electrode on which an opening pattern is formed; and a liquid crystal layer disposed between the first substrate and the second substrate, wherein the unit pixel electrode comprises:

a central electrode portion comprising a plurality of diagonal sides, a plurality of connection sides, a cross slit extending in the first and second directions, and a plurality of central branch slits extending from the cross slit; and a branch electrode portion comprising a plurality of branch electrodes protruding from each of the diagonal sides, wherein the connection sides comprise first connection sides extending in the first direction and second connection sides extending in the second direction, and wherein the central electrode portion has first outer areas adjacent to the first connection sides and on which first control slits extending in the first direction are respectively formed.

2. The display device of claim 1, wherein the central electrode portion further has second outer areas adjacent to the second connection sides and on which second control slits extending in the second direction are respectively formed.

3. The display device of claim 1, wherein each of the pixel electrodes comprises a first unit pixel electrode, a second unit pixel electrode, and a third unit pixel electrode arranged in the first direction.

4. The display device of claim 3, wherein:

in the first unit pixel electrode, the central electrode portion has second outer areas adjacent to the second connection sides thereof and on which second control slits extending in the second direction are respectively formed;

in the second unit pixel electrode, the central electrode portion has a third outer area adjacent to one of the second connection sides adjacent to the first unit pixel electrode and on which a third control slit extending in the second direction is formed; and in the third unit pixel electrode, the central electrode portion has a fourth outer area adjacent to one of the second connection sides adjacent to the first unit pixel electrode of a neighboring pixel electrode and on which a fourth control slit extending in the second direction is formed.

5. The display device of claim 1, wherein each of the first control slits comprises a first partial control slit and a second partial control slit, respectively extending in parallel with the first direction from adjacent diagonal sides.

6. The display device of claim 5, wherein a length of each of the first and second partial control slits is less than $\chi\sqrt{2}$, where $\chi$ denotes a minimum distance between the opening pattern and one of the diagonal sides in a plan view.

7. The display device of claim 1, wherein the opening pattern does not overlap with the cross slit in a plan view.

8. The display device of claim 7, wherein a distance between the opening pattern and the cross slit is at least 3 micrometers in a plan view.

9. The display device of claim 1, wherein:

the central electrode portion has an octagonal shape defined by the diagonal sides and the connection sides; and ends of the branch electrodes are disposed along imaginary extension lines of the connection sides.

10. The display device of claim 1, wherein a width of each of the first control slits is equal to a distance between adjacent branch electrodes.

11. The display device of claim 1, wherein a minimum distance between the first connection sides and the first control slits is equal to a width of each of the branch electrodes.

12. The display device of claim 1, wherein:

the diagonal sides comprise:

first diagonal sides extending in a third direction intersecting the first and second directions; and second diagonal sides extending in a fourth direction intersecting the first to third directions; and at least a portion of the branch electrodes extending from the first diagonal sides extend in parallel with the fourth direction, and at least a portion of the branch electrodes extending from the second diagonal sides extend in parallel with the third direction.

13. The display device of claim 12, wherein the opening pattern is disposed between the central branch slits and the branch electrodes in a plan view.

14. A display device comprising:

a first substrate comprising a unit pixel electrode;

a second substrate comprising a common electrode; and a liquid crystal layer disposed between the first substrate and the second substrate, wherein:

the unit pixel electrode comprises a cross slit, a plurality of central branch slits, a plurality of outer branch slits, and a first control slit;

the cross slit comprises slits extending in a first direction and a second direction to intersect each other at a center of the unit pixel electrode;

the central branch slits extend from the cross slit in a third direction and a fourth direction intersecting the first and second directions, respectively;

the outer branch slits extend from a contour of the unit pixel electrode toward the central branch slits in the third direction and the fourth direction;

the first control slit extends in the first direction in a first outer area adjacent to the contour of the unit pixel electrode; and the first control slit does not overlap with the outer branch slits when viewed in the second direction.

15. The display device of claim 14, wherein the first outer area is defined between the contour of the unit pixel electrode and an end of the cross slit extending in the second direction.

16. The display device of claim 14, wherein:

the unit pixel electrode further comprises a second control slit extending in the second direction in a second outer area adjacent to the contour of the unit pixel electrode; and the second control slit does not overlap with the outer branch slits when viewed in the first direction.

17. The display device of claim 16, wherein the second outer area is defined between the contour of the unit pixel electrode and an end of the cross slit extending in the first direction.

18. The display device of claim 14, wherein:

the common electrode has an opening pattern; and the opening pattern overlaps with an area between the central branch slits and the outer branch slits in a plan view.

19. The display device of claim 18, wherein:

the opening pattern does not overlap with the cross slit in a plan view; and a distance between the opening pattern and the cross slit is at least 3 micrometers in a plan view.

20. The display device of claim 14, wherein a width of the first control slit is equal to a width of each of the outer branch slits.

* * * * *